(No Model.)
B. RÜCKERT.
FOLDING BOX.
No. 268,542.  Patented Dec. 5, 1882.
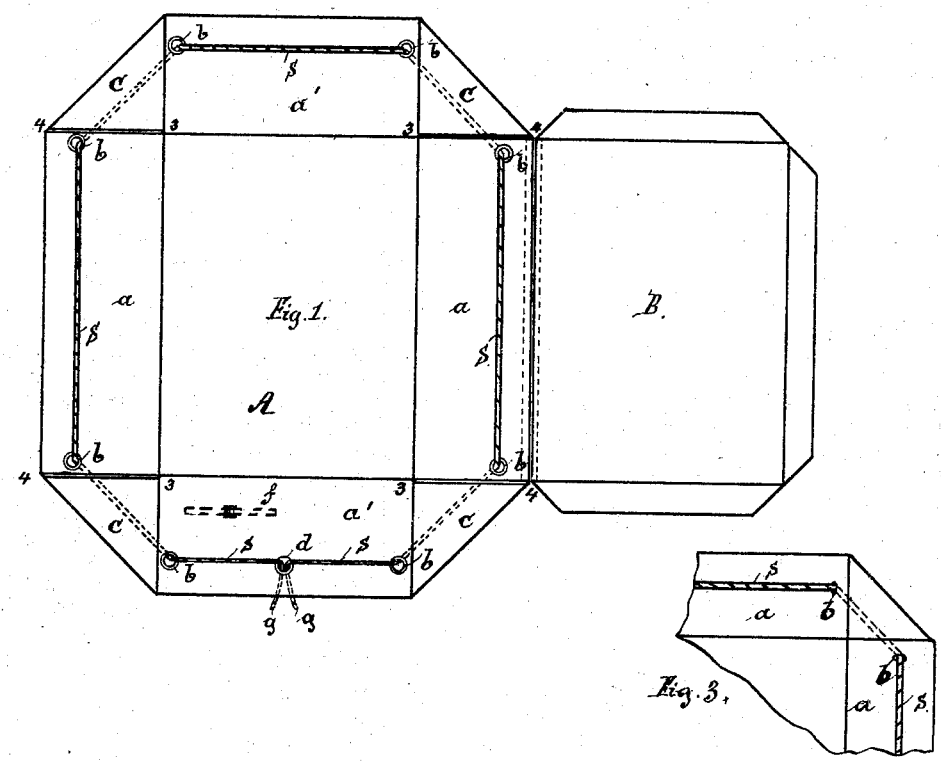
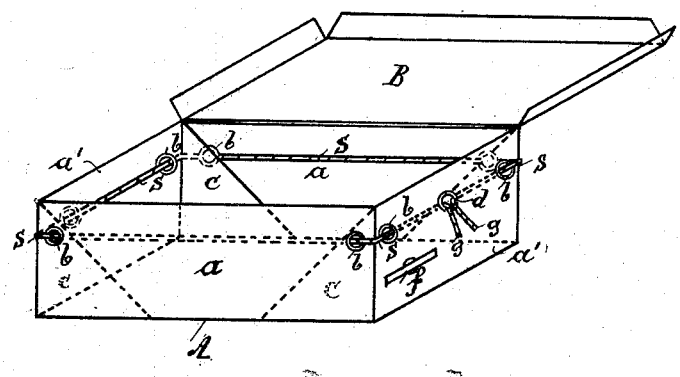
Witnesses
Richard F. Nagle
Inventor.
Bruno Rückert
per Henry E. Roeder
Attorney

UNITED STATES PATENT OFFICE.

BRUNO RÜCKERT, OF LEIPSIC, GERMANY.

FOLDING BOX.

SPECIFICATION forming part of Letters Patent No. 268,542, dated December 5, 1882.

Application filed July 1, 1882. (No model.) Patented in Belgium December 21, 1881, No. 18,908.

*To all whom it may concern:*

Be it known that I, BRUNO RÜCKERT, a citizen of Germany, residing in the city of Leipsic, in the Empire of Germany, have invented a new and useful Improvement in Folding Boxes, of which the following is a specification, and for which Letters Patent have been granted to me by the government of Belgium on the 21st day of December, 1881, numbered 18,908.
The nature of my invention consists in the arrangement of a cord with the sides of a box so constructed that the sides of the same are jointed or hinged to the bottom, whereby when the box is empty and not in use the same can be turned down, and will there lie flat, occupying very little space, and when the box is to be used the sides and ends are turned upward and fastened together by means of said cord.

In the accompanying drawings, Figure 1 represents a box with the sides and ends turned down so as to lie flat. Fig. 2 represents the box put together ready for use. Fig. 3 is a detail showing one corner.

A is the bottom of the box, to which the sides and ends $a\ a$ and $a'\ a'$ are jointed or hinged, capable of being turned upright or to lie flat. The triangular corner-sections $c$ are attached to the ends $a'$, and the blank forming the box is cut through at the lines 3 4, so that said corner-sections may be turned at right angles to the ends $a'$. The sides $a\ a$ or ends $a'\ a'$ are provided with slits or holes $b\ b$—one at each end—through which a cord, $s$, is drawn, so that the same will lie at the inside of said sides and ends from their holes $b$ to $b$, and then pass outside from the hole $b$ in one end or side to the adjoining hole $b$ in the other end or side, the two ends of said cord passing through a hole, $d$, in one of the sides $a$ or ends $a'$.
If desired, the cover B of the box may be jointed to one of the sides, as shown in the drawings; or the same may be made separate.

When the box is not in use, and the ends and sides turned downward for the purpose of stowing away, the cord $s$ will be considerably extended, and when the box is put together or the sides put up ready for use, as shown in Fig. 2, the cord $s$ will be drawn together, holding thereby the sides $a\ a$ and ends $a'\ a'$ in their upright position, and the ends $g\ g$ of the cord $s$ may then be fastened to a suitable projection or knob, $f$; or the projecting part of the cord may be used to pass over the cover and around the box, and thus fasten the cover to the box.

When the box or blank is folded the triangular corner-pieces $c$ are turned inside and strengthen the corners, while the tightening of the cord $s$ passes around the outside of the edges of the side and end pieces, keeping the same perfectly tight and firm.

I do not claim a box having the sides and ends jointed or hinged to the bottom, so as to lie down flat and capable of being turned upward, as required; but

What I claim as my invention, and desire to secure by Letters Patent, is—

In combination with a box having the sides and ends jointed or hinged to the bottom, a cord, $s$, passing along the inner surfaces of the sides and ends, then through suitable slits or holes, $b\ b$, near the ends of said sides and end pieces, around the outside of the edges or corner of the same, and through a hole, $d$, again to the outside, substantially as described and shown.

BRUNO RÜCKERT.

Witnesses:
OTTO SACK,
PAUL WETZIG.